United States Patent
Tanabe et al.

[11] Patent Number: 6,080,371
[45] Date of Patent: Jun. 27, 2000

[54] CATALYTIC CONVERTER AND HONEYCOMB METALLIC CATALYST BED UNIT THEREFOR

[75] Inventors: Hiroshi Tanabe, Yokohama; Eizo Suyama, Tokyo, both of Japan

[73] Assignee: Calsonic Corporation, Tokyo, Japan

[21] Appl. No.: 09/010,587

[22] Filed: Jan. 22, 1998

[30] Foreign Application Priority Data

Apr. 9, 1997 [JP] Japan ................................. 9-090801

[51] Int. Cl.[7] ........................... B01D 53/34; B01J 35/04; F01N 3/28
[52] U.S. Cl. ...................... 422/180; 422/177; 502/527.22
[58] Field of Search ..................................... 422/171, 174, 422/177, 180, 179; 60/299, 300; 502/527.22

[56] References Cited

U.S. PATENT DOCUMENTS

| | | | |
|---|---|---|---|
| 4,909,994 | 3/1990 | Nishizawa et al. ...................... | 422/180 |
| 5,153,167 | 10/1992 | Saito et al. ............................... | 502/439 |
| 5,202,303 | 4/1993 | Retallick et al. ........................ | 502/439 |
| 5,323,608 | 6/1994 | Honma ..................................... | 60/299 |

FOREIGN PATENT DOCUMENTS

| | | |
|---|---|---|
| 0 298 943 | 1/1989 | European Pat. Off. . |
| 28 15 317 | 10/1979 | Germany . |
| 57-8915 | 2/1982 | Japan . |
| 1-242152 | 9/1989 | Japan . |
| 6-198197 | 7/1994 | Japan . |
| 2 079 174 | 1/1982 | United Kingdom . |

*Primary Examiner*—Hien Tran
*Attorney, Agent, or Firm*—Foley & Lardner

[57] ABSTRACT

A plurality of corrugated sheet metal portions are put on one another to constitute a honeycomb metallic catalyst bed. Each sheet metal portion has a plurality of straight, parallel, alternate ridge and groove portions, so that when each upper sheet metal portion is properly put on a corresponding lower sheet metal portion having the groove portions of the upper sheet metal portion put on the ridge portions of the lower sheet metal portion, there are defined therebetween a plurality of through cells each having a regular square cross section. A case encases therein the honeycomb metallic catalyst bed. Inlet and outlet pipes are connected to front and rear ends of the case.

11 Claims, 12 Drawing Sheets

CATALYTIC CONVERTER AND HONEYCOMB METALLIC CATALYST BED UNIT THEREFOR

The contents of Japanese Patent Applications 8-191959 and 9-90801 filed Jul. 22, 1996 and Apr. 9, 1997 respectively are hereby incorporated by reference.

BACKGROUND OF THE INVENTION

1. Field of the Invention

The present invention relates In general to a catalytic converter installed in an exhaust system of a motor vehicle to reduce noxious components contained In a gas exhausted from an engine of the motor vehicle, More specifically, the present invention is concerned with a catalytic converter which has a honeycomb metallic catalyst bed unit mounted therein.

2. Description of the Prior Art

Hitherto, honeycomb beds have been widely used as a catalyst carrier for catalyst converters. Nowadays, some of the honeycomb beds are constructed of a sheet metal, such as a Fe—Cr—Al system ferrite stainless steel sheet metal (viz., 20Cr—5Al—La—Fe) or the like.

To produce such honeycomb metallic catalyst beds, various methods have been proposed and put into practical use. One method is disclosed in Japanese Patent First Provisional Publication 1-242152. In this method, an elongate corrugated sheet metal and an elongate flat sheet metal are put on each other and then they are rolled up to produce a metallic bed in the shape of cylinder or elliptic cylinder. Then, to suppress relative displacement between the two sheet metals, the metallic bed is subjected to a soldering process to solder or braze contacting portions of the two sheet metals. Laser soldering and vacuum brazing methods are commonly used for such soldering. In another method, corrugated sheet metals of different widths and flat sheet metals of different widths are alternately put on one over another to produce a metallic bed in the shape of cylinder or elliptic cylinder. Then, the metallic bed is subjected to a soldering process for soldering the sheet metals. The metallic bed thus produced in the above-mentioned manners has a plurality of through cells 5 as is shown in FIG. 20. In this drawing, denoted by numerals 1 and 3 are the corrugated and flat sheet metals respectively. These two types of sheet metals 1 and 3 are soldered or brazed at portions 7. As shown, each of through cells 5 defined In the metallic bed has a generally triangular cross section. The produced metallic bed is then subjected to a catalyst treating process to have surfaces of the through cells 5 coated with catalyst layer. Usually, for the catalyst treating process, a dipping method is used wherein the metallic bed is dipped in a wash coat solution for a given time. The wash coat solution Is a solution containing catalyst, γ-alumina and additives. Thus, when the metallic bed is taken out from the solution, the entire surfaces of the through cells 5 are coated with the wash coat layer or catalyst layer. The metallic bed is then heated to dry up the catalyst layer on the surfaces. The metallic catalyst bed is then encased in a metallic case and soldered to the same.

However, due to inherent construction, the catalytic converter produced in the above-mentioned conventional methods has the following drawbacks.

First, as is seen from FIG. 20, when the metallic bed is dipped up out of the wash coat solution, surfaces of through cells are coated or wetted with the solution or catalyst layer 9. However, as is seen from this drawing, at portions "T" where an acute angle is defined between mutually soldered segments of the two types of sheet metals 1 and 3, there is collected a larger amount of catalyst due to the nature of surface tension of solution at such acute angle spaces. This means that an effective surface area of the catalyst layer on the surfaces of the through cells 5 is reduced by a certain degree and most of the catalyst in the portions "T" is wastefully used.

Second, usage of two types of sheet metals tends to lower the solidity or mechanical strength possessed by the metallic bed. In fact, the flat sheet metal can not smoothly absorb the thermal stress like in a manner as is exhibited by the corrugated sheet metal. Thus, when the metallic bed constructed of the two types of sheet metals is exposed to the highly heated exhaust gas for a long time, a considerable deformation tends to occur in the bed due to the thermal stress difference between the two types of sheet metals.

Third, soldering or brazing the two types of sheet metals needs a skilled and thus expensive technique. If the soldering or brazing is poorly made, undesired film-out phenomenon of the layered sheet metals of the metallic bed tends to occur.

SUMMARY OF THE INVENTION

It is therefore an object of the present invention to provide a catalytic converter which is free of the above-mentioned drawbacks.

It is another object of the present invention to provide a honeycomb metallic catalyst bed unit which is free of the above-mentioned drawbacks.

According to a first aspect of the present invention, there is provided a catalytic converter which comprises a plurality of corrugated sheet metal portions which are put on one another to constitute a honeycomb metallic catalyst bed, each sheet metal portion having a plurality of straight, parallel, alternate ridge and groove portions, so that when each upper sheet metal portion is properly put on a corresponding lower sheet metal portion having the groove portions of the upper sheet metal portion put on the ridge portions of the lower sheet metal portion, there are defined therebetween a plurality of through cells each having a regular square cross section; a case for encasing therein the honeycomb metallic catalyst bed; and inlet and outlet pipes which are connected to front and rear ends of the case.

According to a second aspect of the present invention, there is provided a honeycomb metallic catalyst bed unit for a catalytic converter. The unit comprises a plurality of corrugated sheet metal portions which are put on one another to constitute a honeycomb metallic catalyst bed, each sheet metal portion having a plurality of straight, parallel, alternate ridge and groove portions, so that when each upper sheet metal portion is properly put on a corresponding lower sheet metal portion having the groove portions of the upper sheet metal portion put on the ridge portions of the lower sheet metal portion, there are defined therebetween a plurality of through cells each having a regular square cross section; and a case for encasing therein the honeycomb metallic catalyst bed.

BRIEF DESCRIPTION OF THE DRAWING

Other objects and advantages of the present invention will become apparent from the following description when taken in conjunction with the accompanying drawings, in which.

DETAILED DESCRIPTION OF EMBODIMENTS

Figure 5:
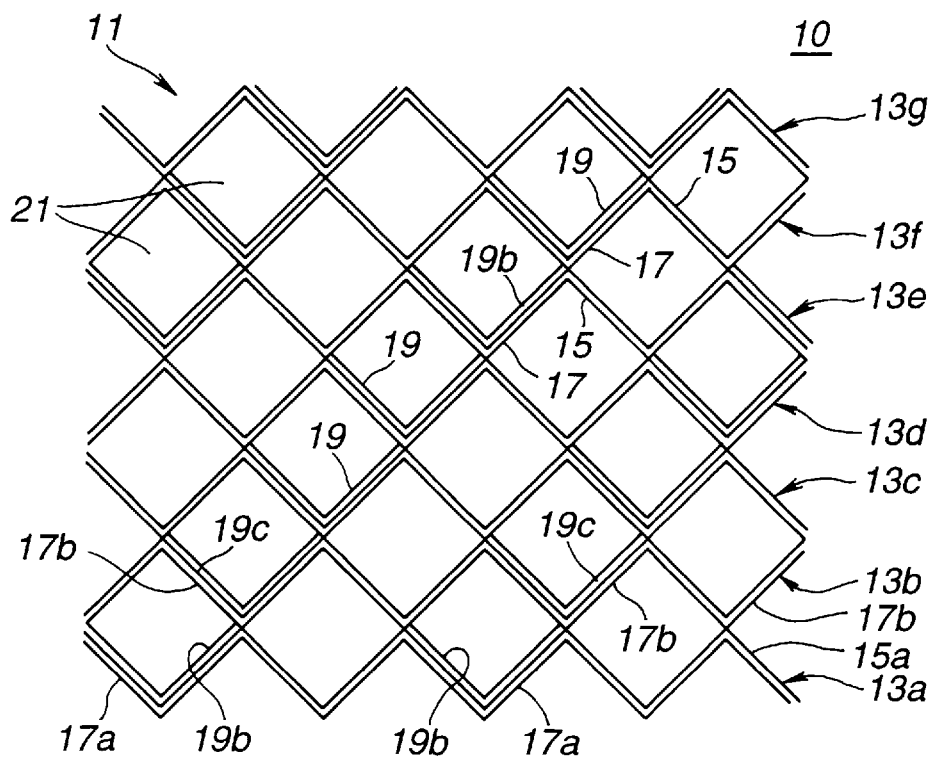
FIG. 5 is an enlarged sectional view taken along the line V—V of FIG. 1.
Figure 6:
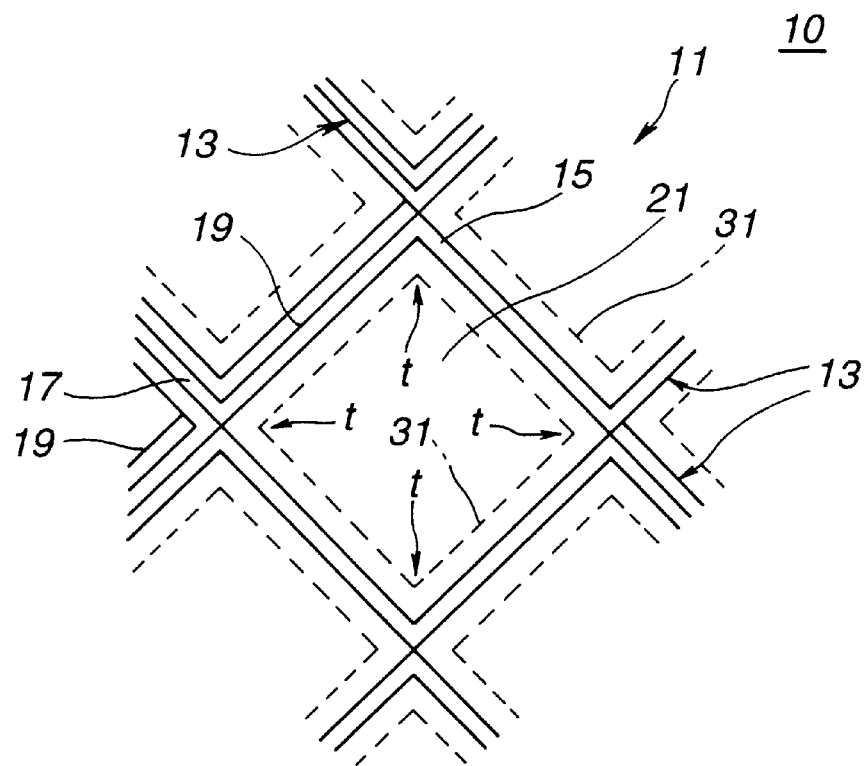
FIG. 6 is an enlarged sectional view of through cells defined in the metallic bed unit of FIG. 1.
Figure 7:
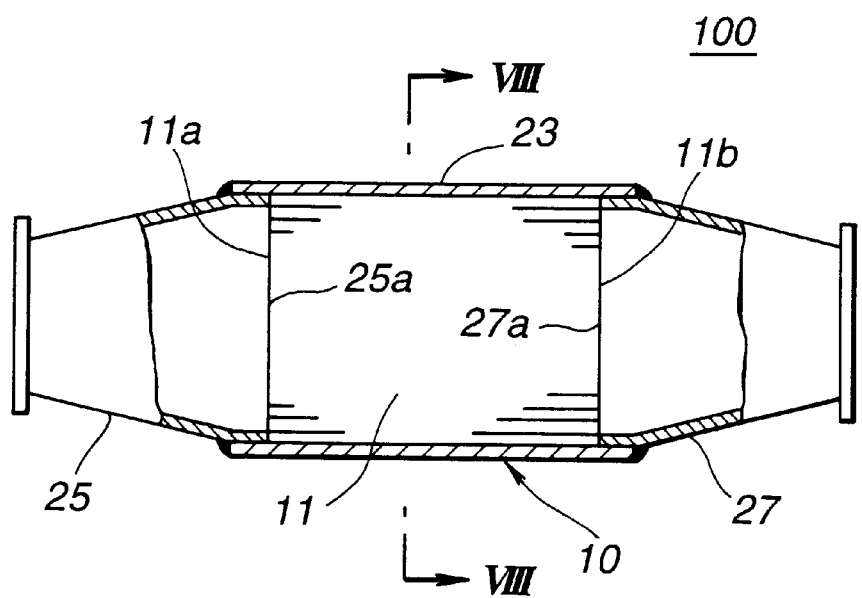
FIG. 7 is a sectional view of the catalytic converter of the first embodiment, which has the honeycomb metallic catalyst bed unit of FIG. 1 mounted therein.
Figure 8:
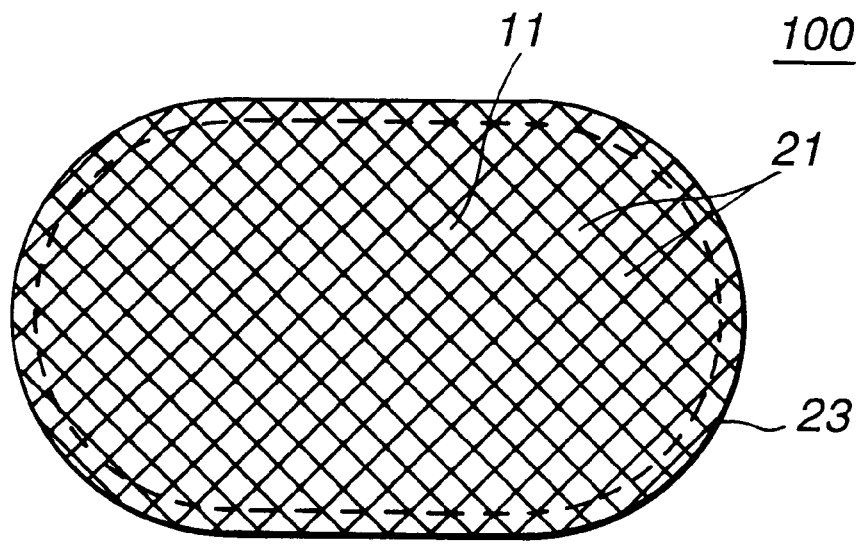
FIG. 8 is a sectional view taken along the line VIII—VIII of FIG. 7.

Referring to FIGS. 1 to 11 of the drawings, particularly FIG. 7, there is shown a catalytic converter 100 which is a first embodiment of the present invention. The catalytic converter 100 has a honeycomb metallic catalyst bed unit 10 mounted therein.

Figure 1:
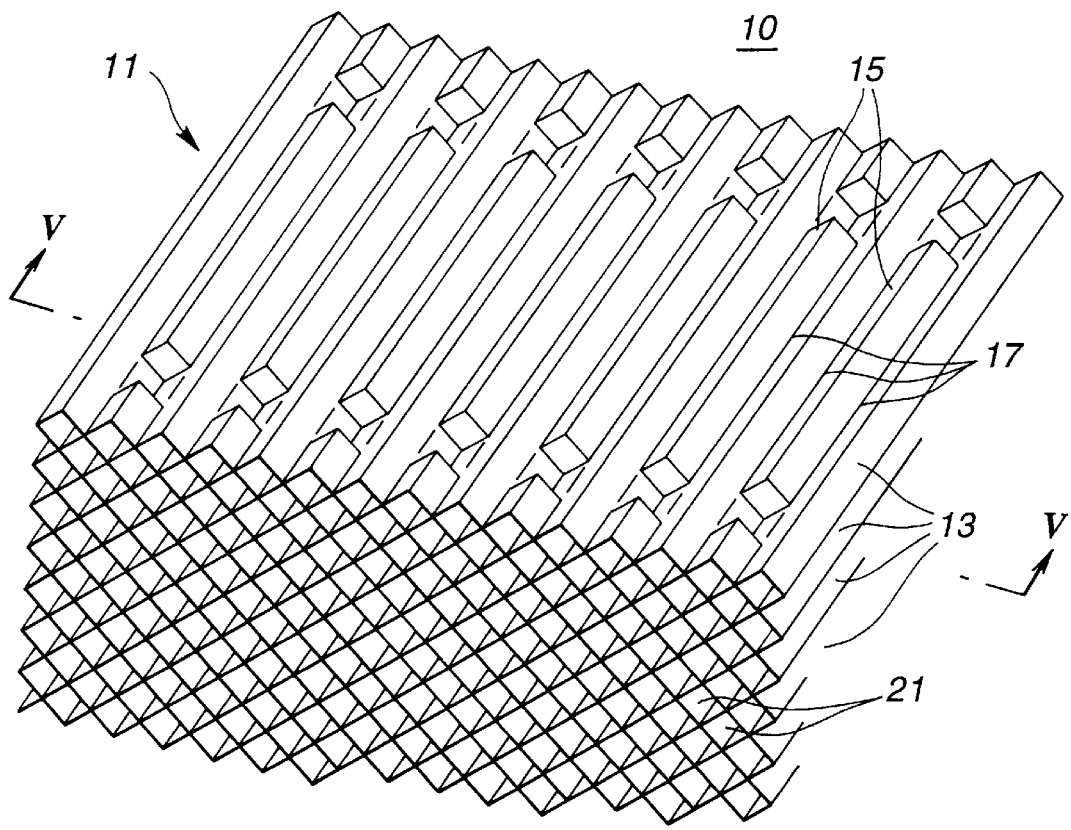
FIG. 1 is a partial and perspective view of a honeycomb metallic catalyst bed unit which constitutes an essential part of a is catalytic converter of a first embodiment of the present invention.

As is seen from FIGS. 1 and 2, the metallic catalyst bed unit comprises a plurality of corrugated sheet metals 13 which are put on one another in a manner as will be described hereinafter. The metals 13 are constructed of for example Fe—Cr—Al alloy or the like. The sheet metals 13 are equal in length but different in width. It is to be noted that the length of the sheet metal 13 is a dimension measured along the corrugations and the width of the sheet metal 13 is a dimension measured across the corrugations.

Figure 2:
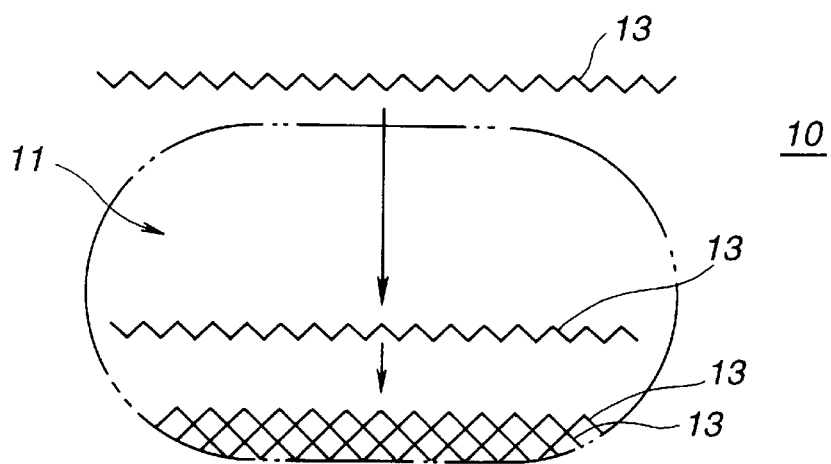
FIG. 2 is an illustration for explaining the method of producing the honeycomb metallic catalyst bed unit of FIG. 1.

As is understood from FIG. 2, until the vertically middle position of the bed unit 10, the widths of the stacked sheet metals 13 gradually increase with increase of distance from the lowest part, and after the middle position, the widths of the stacked sheet metals 13 gradually decrease.

The metallic catalyst bed unit 10 is produced by taking the following steps.

First, a plurality of corrugated sheet metals 13 are prepared, which are equal in length but different in width. As is seen from FIG. 3, each of the corrugated sheet metals 13 is produced by applying a known louver-corrugation forming process to a flat sheet metal. With this process, a plurality of straight, parallel, alternate ridge and groove portions 15 and 17 are formed in the sheet metal 13 at a given pitch, as shown. As is seen from FIG. 5, each of the ridge and groove portions 15 and 17 is defined by two jointed segments which meet at right angles (viz., at 90°).

Figure 3:
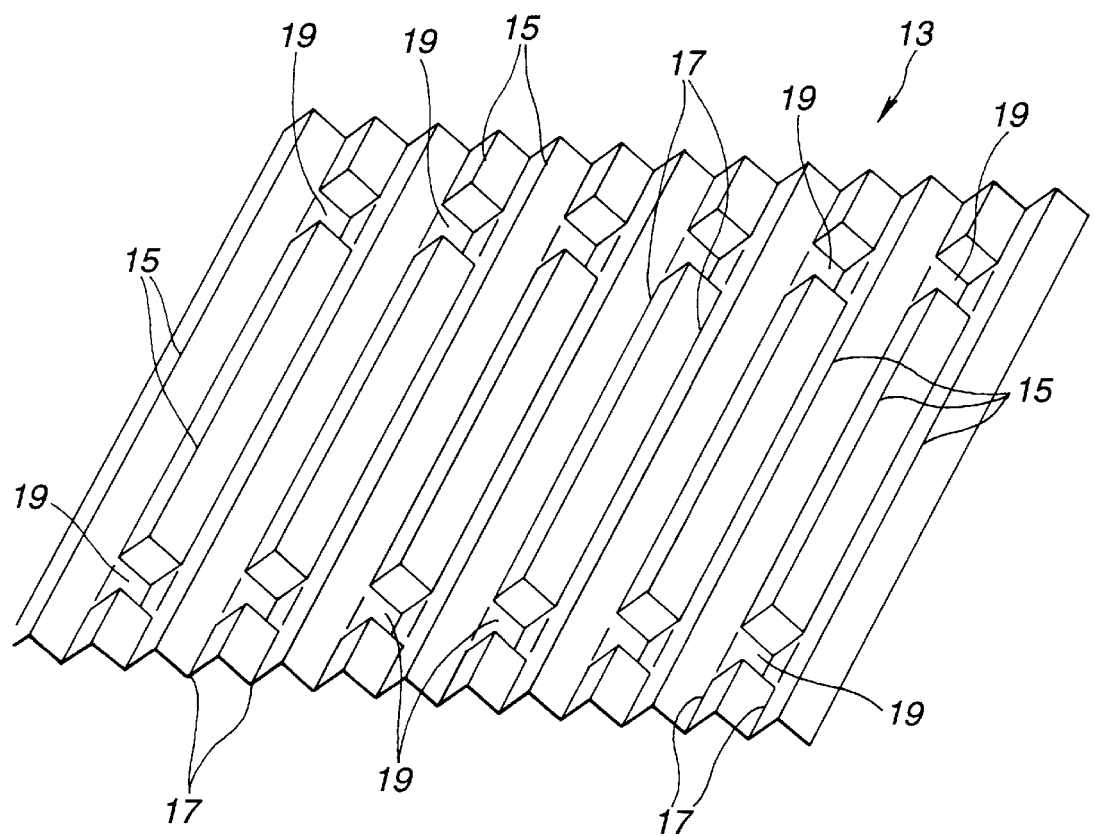
FIG. 3 is a partial, enlarged and perspective view of one of corrugated sheet metals used for producing the metallic bed unit of FIG. 1.
Figure 4:
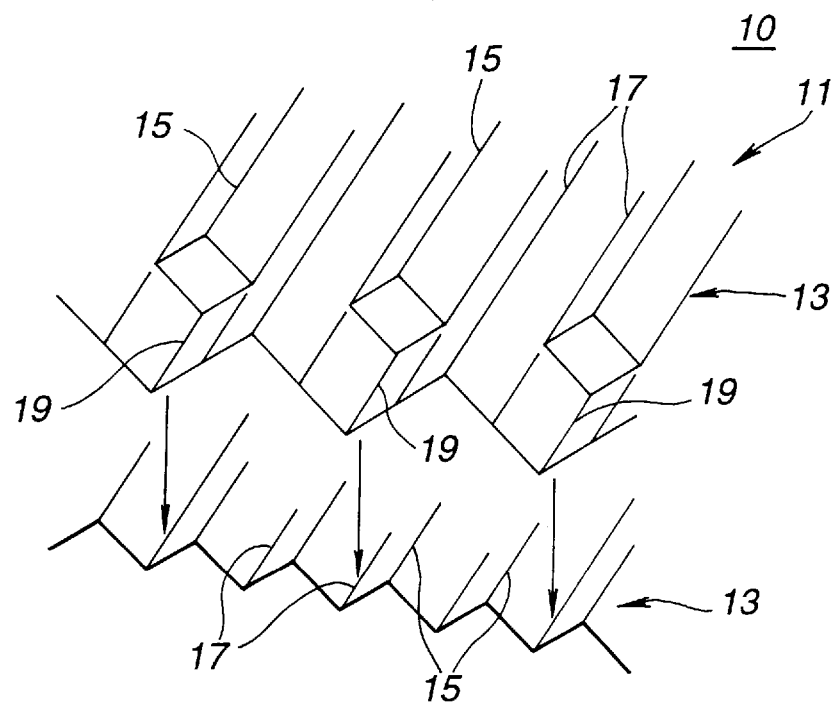
FIG. 4 is an illustration explaining the manner in which each upper sheet metal is put on corresponding lower sheet metal for producing the metallic bed unit of FIG. 1.

As is seen from FIGS. 3, 4 and 5, particularly FIG. 3, every second ridge portions 15 of each sheet metal 13 have each at longitudinally spaced positions two pressed out portions 19 which extend downward. If desired, more than two pressed out portions 19 may be provided in the ridge portion 15. Furthermore, if desired, such pressed out portions 19 may be provided in every three ridge portions 15 of each sheet metal 13.

As is seen from FIG. 5, each pressed out portion 19 is defined by two jointed segments which meet at right angles. For stacking the sheet metals 13, a first sheet metal 13a is put on a flat table (not shown). Then, a second sheet metal 13b is put on the first sheet metal 13a in parallel having bottoms of the groove portions 17b of the second sheet metal 13b put on tops of the ridge portions 15a of the first sheet metal 13a. In this case, the downwardly pressed out portions 19b of the second sheet metal 13b are neatly put into the corresponding groove portions 17a of the first sheet metal 13a. With this, lateral displacement between the first and second sheet metals 13a and 13b is suppressed. That is, the downwardly pressed out portions 19b can serve as laterally positioning members of the second sheet metal 13b relative to the first sheet metal 13a and vice versa.

Then, a third sheet metal 13c is put on the second sheet metal 13b in the same manner as is described hereinabove. In this case, the downwardly pressed out portions 19c of the third sheet metal 13c are neatly put into the corresponding groove portions 17b of the second sheet metal 13b. Thus, lateral displacement between the second and third sheet metals 13b and 13c is suppressed.

Then, fourth, fifth, sixth, seventh . . . n-th sheet metals 13d, 13e, 1f, 13g . . . are put on one another, in order in the same manner. Thus, when all of the sheet metals 13a, 13b, 13c . . . are properly stacked, they constitute such a honeycomb metallic bed 11, as is partially shown in FIG. 1. Due to the reason as mentioned hereinabove, undesired lateral displacement between any two contacting sheet metals 13 is suppressed, and thus the metallic bed 11 has a certain resistance against an external force applied thereto from a lateral direction.

Then, as is seen from FIGS. 2 and 7, the metallic bed 11 is tightly received in a metallic case 23 to constitute the metallic catalyst bed unit 10. To facilitate the work for receiving the metallic bed 11 in the case 23, the case 23 may be of a split type. Of course, when using the split type, welding is needed for uniting the case after encasing the metallic bed 11. As is seen from FIG. 7, the length of the metallic case 23 is greater than that of the metallic bed 11, so that longitudinal ends 11*a* and 11*b* of the metallic bed 11 are fully received within or concealed by the case 23.

As is seen from FIG. 5, the metallic catalyst bed 11 has a plurality of axially extending through cells 21 defined therein, each being bounded by two jointed segments of each ridge portion 15 and two jointed segments of each groove portion 17.

It is now to be noted that each of the through cells 21 has a regular square cross section.

The metallic catalyst bed unit 10 thus produced is dipped in a wash coat solution for having the surfaces of the through cells 21 coated with a catalyst layer 31 as is seen from FIG. 6. Preferably, in place of the dipping method, a so-called solution flowing method may be used for saving the wash coat solution. In this method, the metallic catalyst bed unit 10 is stood vertically on an annular jig (not shown). That is, the annular jig supports thereon a periphery of a lower end (11*a*, see FIG. 7) of the metallic bed 11 of the unit 10, and the wash coat solution is flowed down from a position above an upper end (11*b*, see FIG. 7) of the metallic bed 11 of the unit 10. With this, the solution is naturally led into the through cells 21 to wet the surfaces of the cells 21 with the solution. It is to be noted that because the periphery of the lower end 11*a* of the metallic bed 11 is supported by the annular jig, downward film-out phenomenon of the layered sheet metals 13 within the case 23 is assuredly suppressed. This advantageous function may be understood from is the drawing of FIG. 7 when considering the inlet pipe 25 as the annular jig. Before drying the catalyst layer 31 on the surfaces of the through cells 21, a known suction process is carried out for obtaining a uniformed thickness of the layer 31 of the catalyst on the surfaces.

Then, as is seen from FIG. 7, inlet and outlet metallic pipes 25 and 27 are connected to the metallic catalyst bed unit 10. As shown, an enlarged outlet portion 25*a* of the inlet pipe 25 and an enlarged inlet portion 27*a* of the outlet pipe 27 are sealingly received in inlet and outlet portions of the metallic case 23 respectively. A known welding technique is used for securing the case 23 to the pipes 25 and 27. It is to be noted that within the metallic case 23, the metallic bed 11 is sandwiched by the enlarged end portions 25*a* and 27*a* of the pipes 25 and 27. Thus, undesired film-out phenomenon of the layered sheet metals 13 within the case 23 is suppressed.

In the following, advantages of the catalytic converter 100 of the first embodiment will be described.

First, there is no need of soldering or brazing the mutually contacting sheet metals 13. That is, for the following reasons, a fixed connection of these sheet metals 13 is achieved in the converter 100 without such an expensive connecting technique. As is seen from FIG. 5, lateral displacement between any two mutually contacting sheet metals 13 is suppressed by the downwardly pressed out portions 19 snugly received in the groove portions 17, and axial displacement between them is suppressed by the enlarged ends 25*a* and 27*a* of the inlet and outlet pipes 25 and 27. For the same reason, there is no need of soldering or brazing each sheet metal 13 to the metallic case 23.

Second, as is seen from FIG. 5, when the metallic bed unit 10 is subjected to the wash coat treating process, the surfaces of the through cells 21 are coated with the catalyst layer 31. Also in this case, a certain amount of catalyst is collected at portions "t" where any two jointed segments of the sheet metals 13 meet at right angles. However, since the right angle is an obtuse angle which is greater than the acute angle possessed by the conventional metallic bed of FIG. 21, the amount of catalyst 20 collected at such portions "t" is smaller than that collected at the portions "T" of the conventional one. Thus, the catalyst layer on the surfaces of the through cells 21 can have a larger effective area than that possessed by the conventional one. In other words, in the invention, wasting of the catalyst is minimized.

Third, since the catalyst bed or metallic bed 11 is produced by using only one type of sheet metals 13, deformation of the bed 11 caused by the thermal stress difference between two types of sheet metals like in the case of the conventional bed of FIG. 21 is suppressed or at least minimized.

Figure 9:
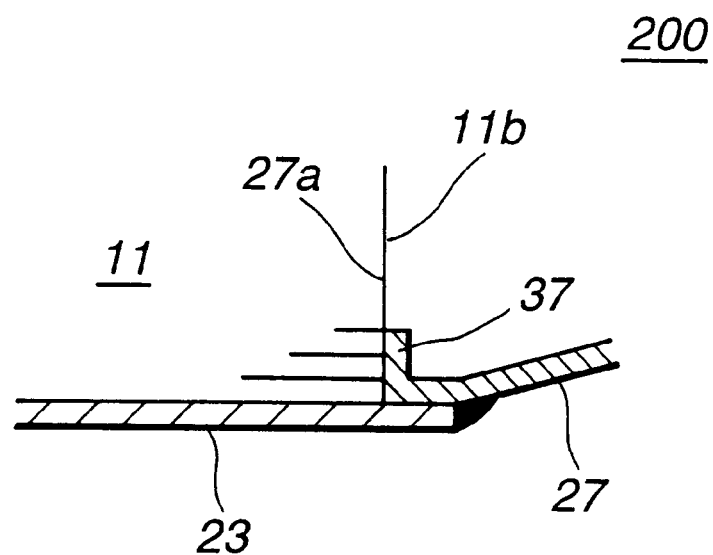
FIG. 9 is an enlarged sectional view of an essential portion of a catalytic converter which is a second embodiment of the present invention.

Referring to FIG. 9, there is partially shown a catalytic converter 200 which is a second embodiment of the present invention. In this embodiment, the enlarged inlet portion 27*a* of the outlet pipe 27 has a radially inwardly protruded flange 37 which abuts against the rear end or longitudinal end 11*b* of the metallic bed 11 in the case 23. Although not shown in the drawing, the enlarged outlet portion (25*a*, see FIG. 7) of the inlet pipe 25 has also a radially inwardly protruded flange which abuts against the front end 11*a* of the metallic bed 11. In this embodiment, suppression of the axial displacement between the sheet metals 13 is much assured.

Figure 10:
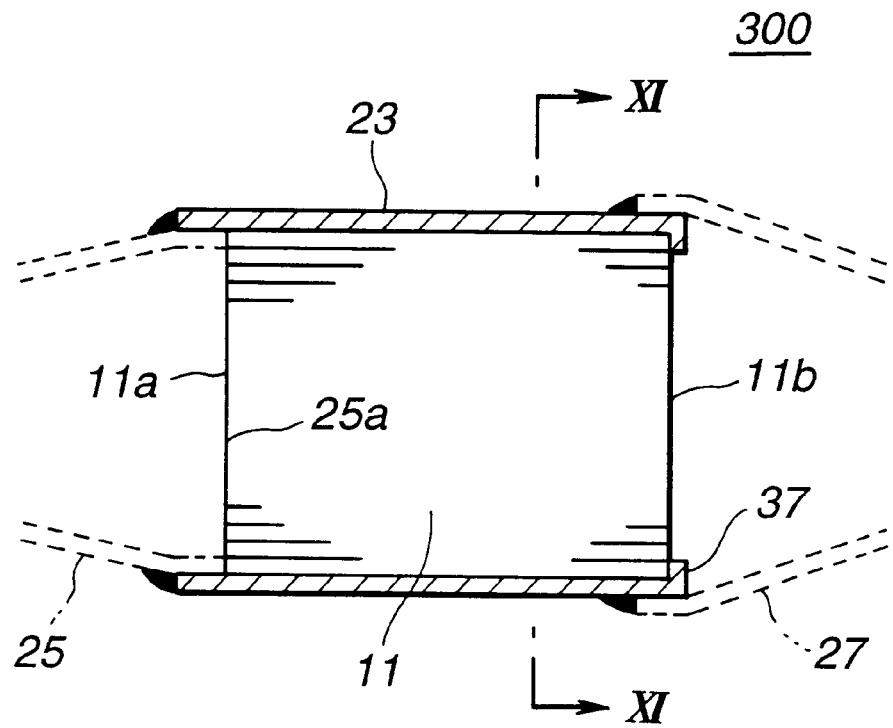
FIG. 10 is a sectional view of a catalytic converter which is a third embodiment of the present invention.
Figure 11:
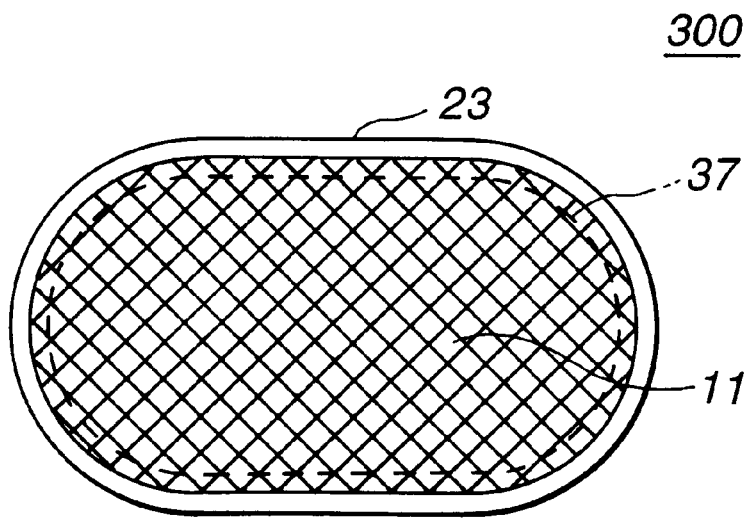
FIG. 11 is a sectional view taken along the line XI—XI of FIG. 10.

Referring to FIGS. 10 and 11, there is partially shown a catalytic converter 300 which is a third embodiment of the present invention. In this embodiment, a rear end of the metallic case 23 is formed with an inwardly extending flange 37 which abuts against the rear end 11*b* of the metallic bed 11 in the case 23. The flanged portion of the case 23 is received in the enlarged inlet portion of the outlet pipe 27, as shown. Also in this embodiment, suppression of the axial displacement between the sheet metals 13 is much assured.

Figure 12:
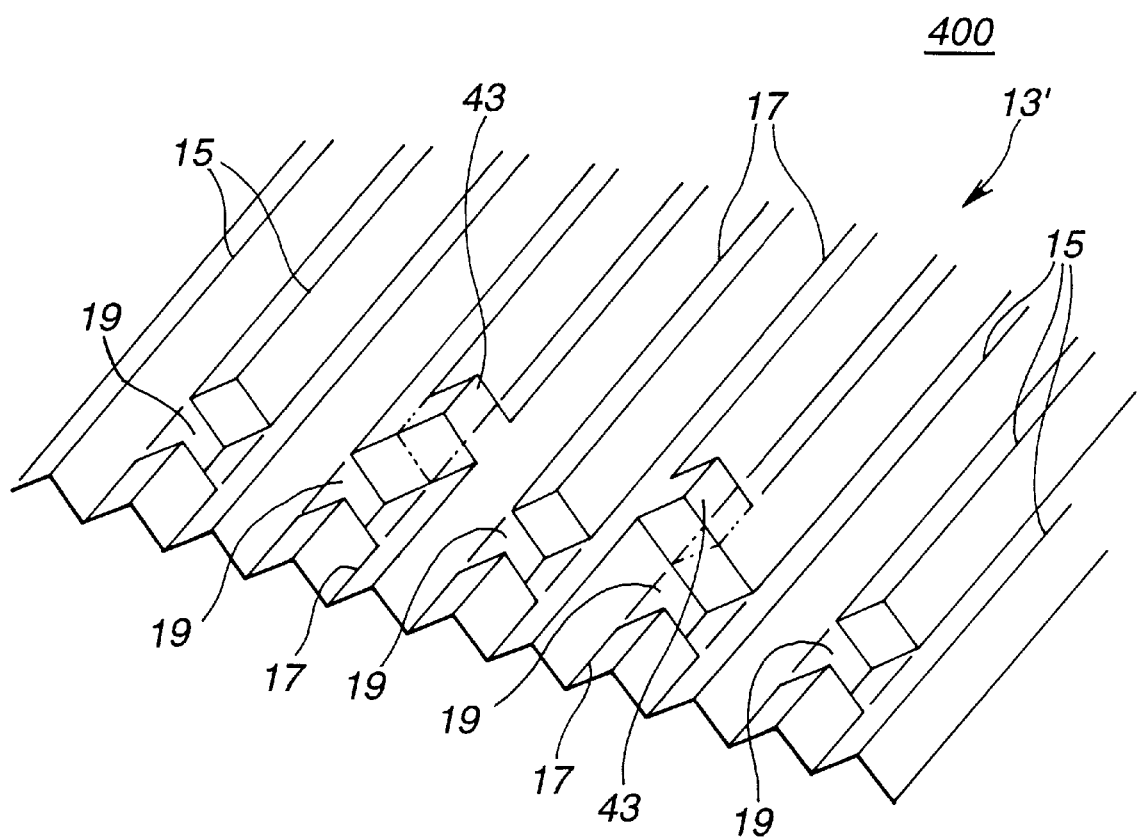
FIG. 12 is a partial, enlarged and perspective view of one of corrugated sheet metals used for producing a modified metallic bed unit for a catalytic converter of a fourth embodiment of the present invention.

Referring to FIG. 12, there is shown one of corrugated sheet metals 13' for a metallic bed mounted in a catalytic converter 400 of a fourth embodiment of the present invention. As shown, the sheet metal 13' has, in addition to the downwardly pressed out portions 19, a plurality of upwardly pressed out portions 43 which serve as a stopper means for suppressing the axial displacement between the two mutually contacting sheet metals 13'. That is, every second groove portions 17 of each sheet metal 13' have each at longitudinally spaced positions two pressed out portions 43 which extend upward. When a second sheet metal (13') is properly put on a first sheet metal 13', each upwardly pressed out portion 43 of the first sheet metal 13' is neatly received in a recessed back part of the corresponding ridge portion (15) of the second sheet metal (13') while engaging at one edge thereof with the downwardly pressed out portion (19) of the second sheet metal (13'). When a third sheet metal (13') is properly put on the second sheet metal (13'), each upwardly pressed out portion (43) of the second sheet metal (13') is neatly received in a recessed back part of the corresponding ridge portion (15) of the third sheet metal (13') while engaging at one edge thereof with the downwardly pressed out portion (19) of the third sheet metal (13'). Like this, when fourth, fifth, sixth . . . n-th sheet metals (13') are properly put on one another in the same manner, there occurs engagement between the upwardly and downward pressed out portions (43, 19) of the mutually contacting lower and upper sheet metals (13'). Thus, in this fourth embodiment 400, the axial displacement between the sheet metals 13' is much assuredly suppressed.

Figure 13:
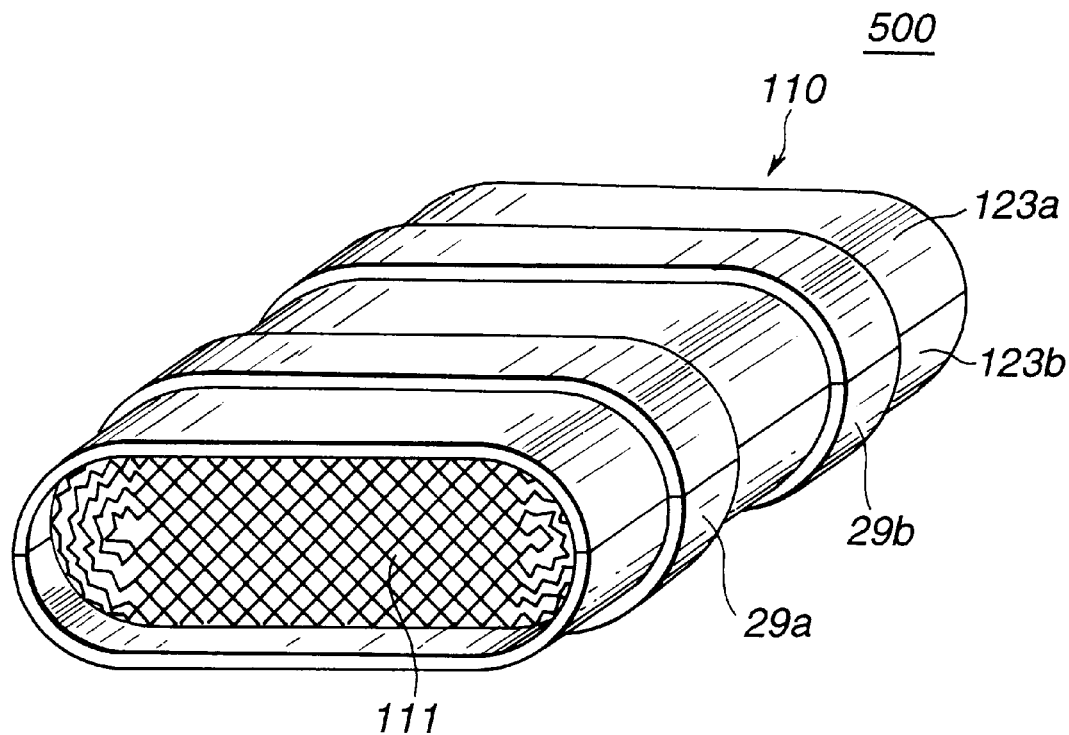
FIG. 13 is a perspective view of a catalyst bed unit for a catalytic converter of a fifth embodiment of the present invention.

Referring to FIGS. 13 to 19, particularly FIG. 13, there is shown a catalytic converter 500 which is a fifth embodiment of the present invention. The catalytic converter 500 has a honeycomb metallic catalyst bed unit 110 which is shown in FIG. 13.

The metallic catalyst bed unit 110 is produced by taking the following steps.

Figure 14:
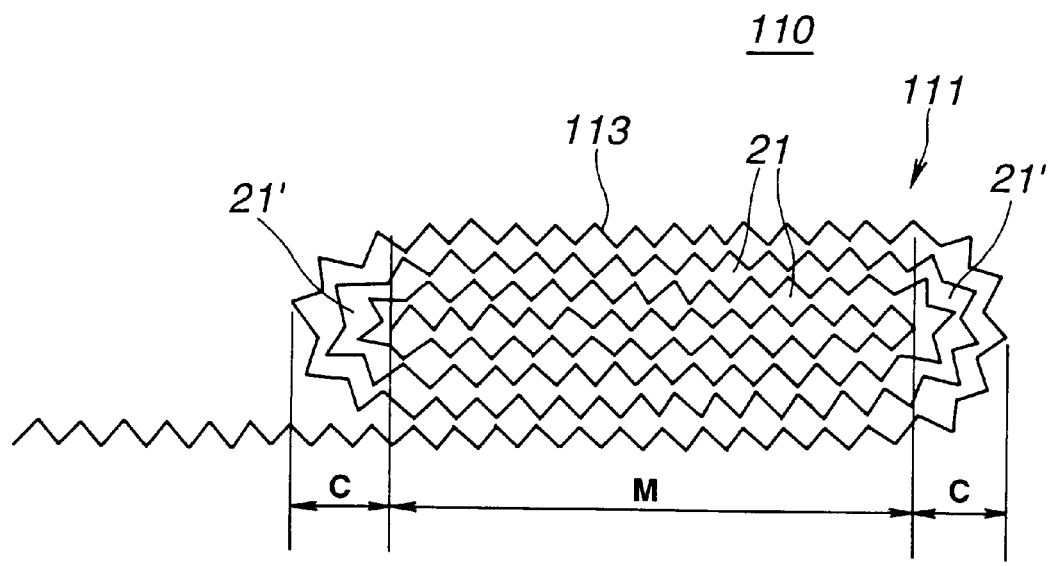
FIG. 14 is an illustration explaining the method of producing a metallic bed unit for the catalytic converter of the fifth embodiment.

First, as is seen from FIG. 14, a single elongate corrugated sheet metal 113 is rolled up many times by a rolling machine (not shown) for producing a honeycomb metallic bed 111.

Figure 15:
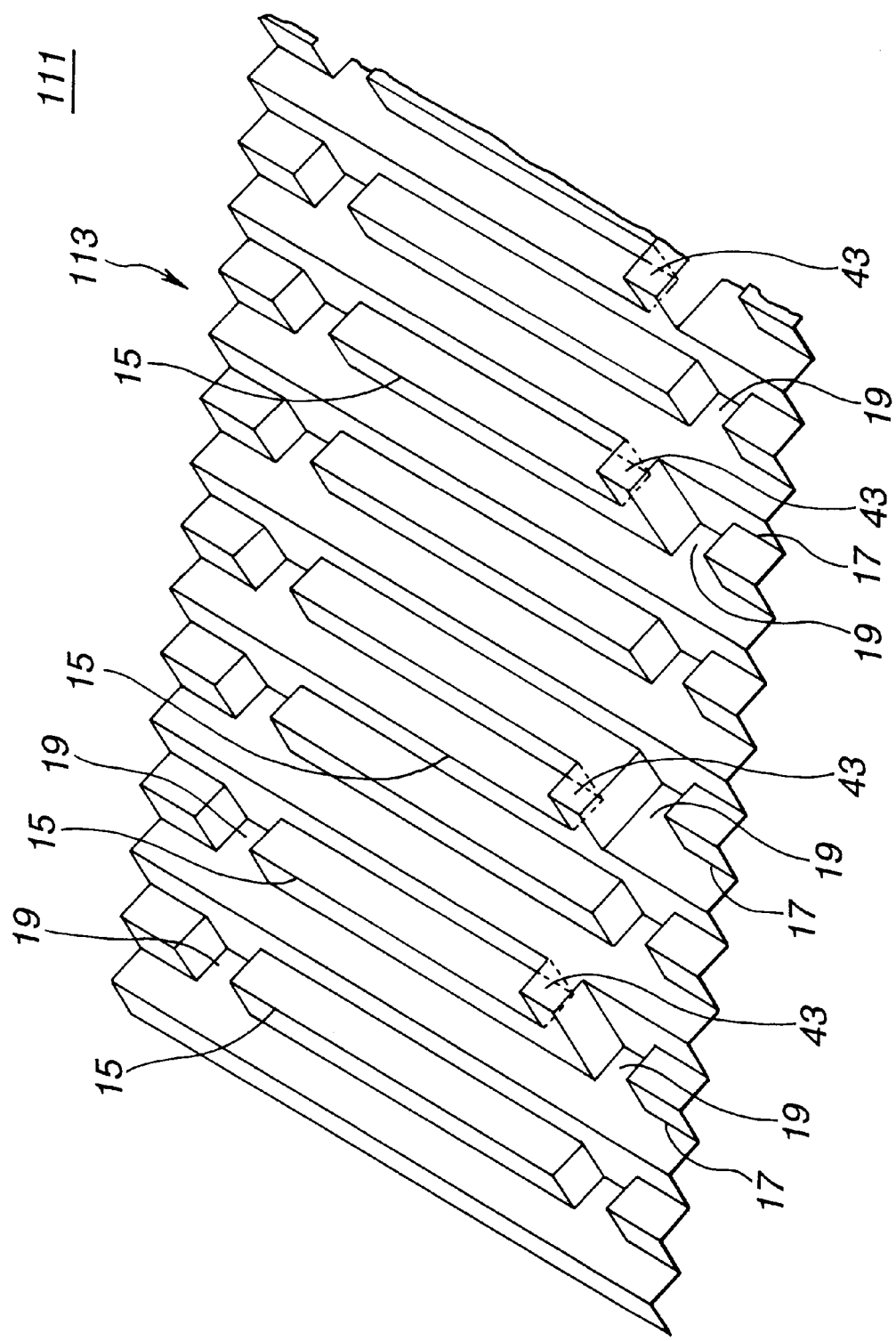
FIG. 15 is a partial, enlarged and perspective view of an elongate corrugated sheet metal used for producing the metallic bed unit for the catalytic converter of the fifth embodiment.

The detail of the sheet metal 113 is shown in FIG. 15. As is seen from this drawing, the sheet metal 113 has substantially the same construction as the sheet metal 13' used in the above-mentioned fourth embodiment 400 of FIG. 12. That is, the sheet metal 113 has downwardly pressed out portions 19 extending from the ridge portions 15 and upwardly pressed out portions 43 extending from the groove portions 17.

When the produced metallic bed 111 has a shape of elliptic cylinder as shown, the same inevitably has two curved portions "C" at both sides of a major straight portion "M". In the major straight portion "M", as is understood from FIG. 17, alternate portions of the sheet metal 113 are neatly or regularly put on another in parallel having bottoms of the groove portions 17 of each upper portion put on tops of the ridge portions of each lower portion. Thus, through cells 21 defined in the major straight portion "M" have each a regular square cross section, as shown.

Figure 16:
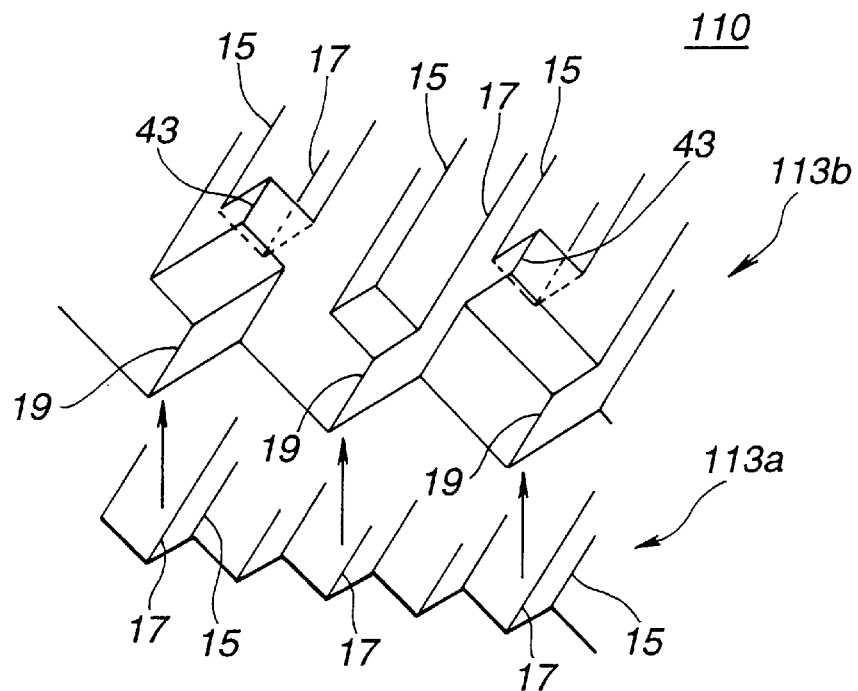
FIG. 16 is an illustration explaining the steps of rolling up the corrugated sheet metal for producing the metallic bed unit for the catalytic converter of the fifth embodiment.
Figure 17:
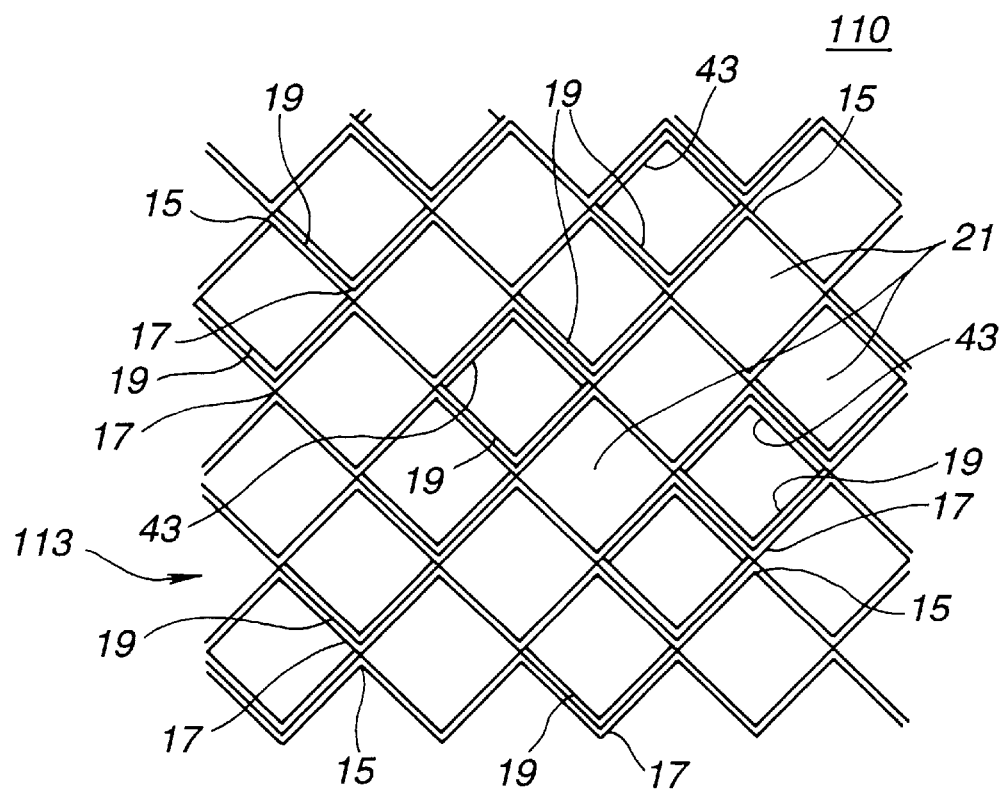
FIG. 17 is a view similar to FIG. 5, but showing the sectional view of the catalyst bed unit for the catalytic converter of the fifth embodiment.

During the rolling of the sheet metal 113, alternate portions 113a, 113b . . . of the same are put on one after another in such a way as is shown in FIG. 16. Furthermore, in the major portion "M", as is seen from FIG. 17, each downwardly pressed out portion 19 of each upper portion is neatly received in the corresponding groove portion of each lower portion to suppress lateral displacement between the two portions, and each upwardly pressed portion 43 of each lower portion is neatly received in a recessed back part of the corresponding ridge portion of each upper portion while engaging at one edge thereof with the downwardly pressed out portion 19 of each upper portion thereby to suppress axial displacement between the two portions.

While, in the curved portions "C", alternate portions of the sheet metal 113 are put on another irregularly. Thus, through cells 21' defined in these curved portions "C" fall to have a regular square cross section.

Figure 18:
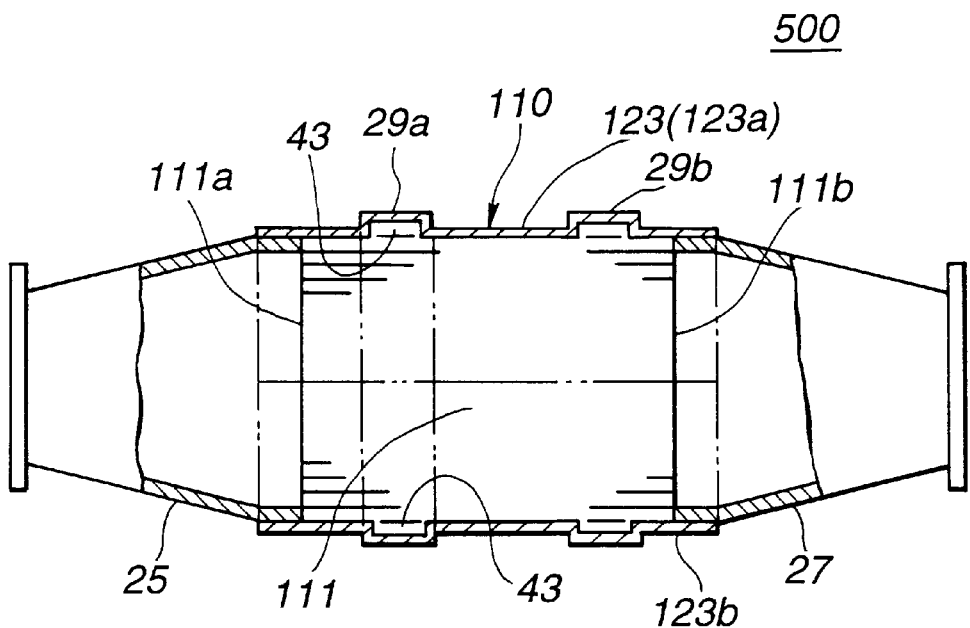
FIG. 18 is a sectional view of the catalytic converter of the fifth embodiment.
Figure 19:
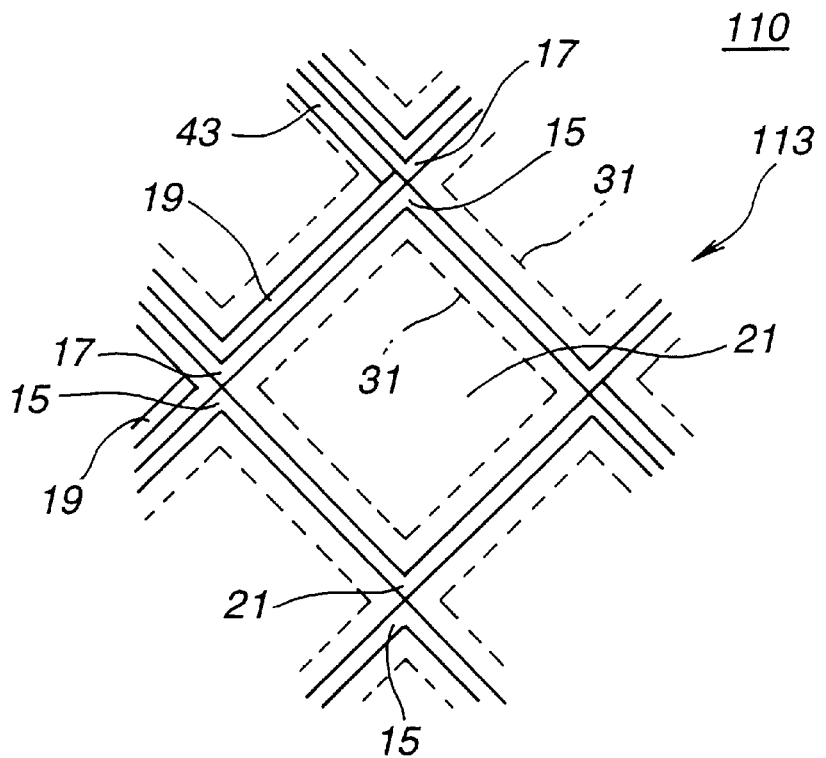
FIG. 19 is an enlarged view of through cells defined in the metallic bed unit for the catalytic converter of the fifth embodiment.
Figure 20:
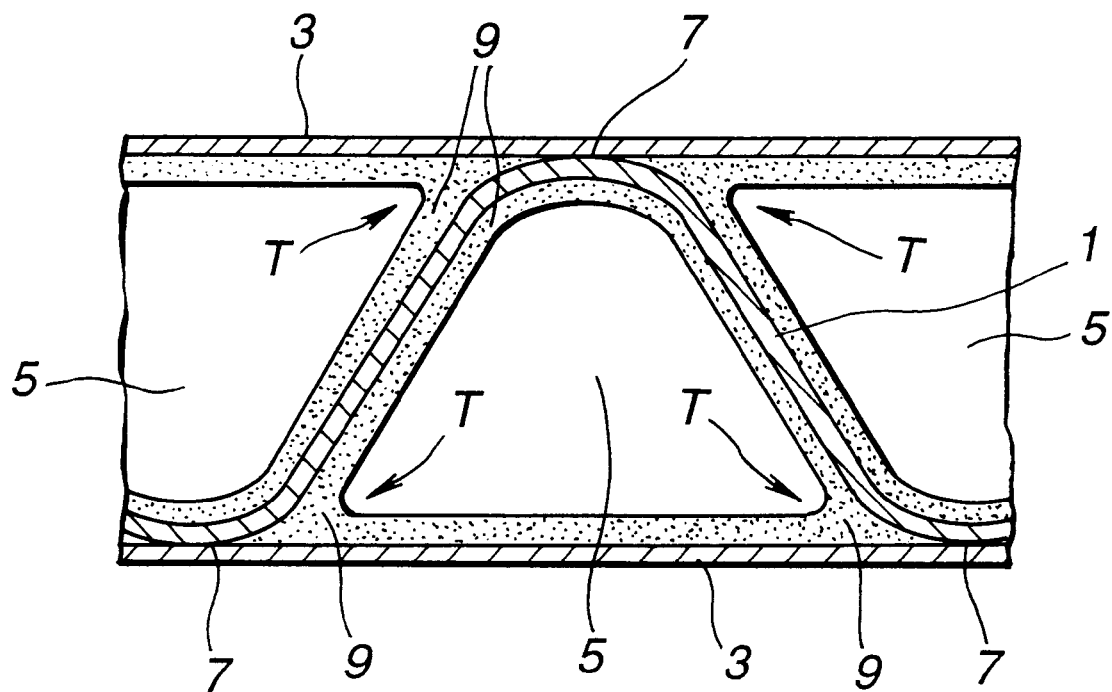
FIG. 20 is an enlarged view of through cells defined in a honeycomb metallic catalyst bed unit for a conventional catalytic converter.

As shown in FIG. 18, the metallic bed 111 thus produced in the above-mentioned manner is tightly received in a metallic case 123. The case 123 shown in this drawing is of a split type including two half-shells i23a and 123b. The case 123 has two enlarged annular portions 29a and 29b into which the upwardly (or radially outwardly) pressed out portions 43 of the outermost portion of the sheet metal 113 are received. With this, the honeycomb metallic catalyst bed 110 is produced. As shown, the length of the metallic case 123 is greater than that of the metallic bed 111, so that longitudinal ends 111a and 111b of the metallic bed 111 are fully received within or concealed by the case 123. After the metallic catalyst bed unit 110 is subjected to a catalyst treating process in the above-mentioned manner, inlet and outlet pipes 25 and 27 are connected to the metallic catalyst bed 110 in the above-mentioned manner.

To those skilled in the art, it is easily understood that the above-mentioned advantages possessed by the first embodiment 100 are equally possessed by the second, third, fourth and fifth embodiments 200, 300, 400 and 500 of the present invention. In addition of these advantages, the catalytic converter 500 of the fifth embodiment has another advantage that it is easily produced.

What is claimed is:

1. A catalytic converter comprising:

a plurality of corrugated sheet metal portions which are put on one another to constitute a honeycomb metallic catalyst bed, each sheet metal portion having a plurality of straight, parallel, alternate ridge and groove portions, so that when each upper sheet metal portion is parallelly put on a corresponding lower sheet metal portion having the groove portions of the upper sheet metal portion put on the ridge portions of the lower sheet metal portion, there are defined therebetween a plurality of parallel through cells each having a regular square cross section, each of said parallel through cells being defined by two jointed segments of the ridge portion of the upper sheet metal portion and two jointed segments of the groove portions of the lower sheet metal portion;

first stopper means which suppresses a lateral displacement between the upper and lower sheet metal portions, said first stopper means comprising portions pressed out downward from the ridge portions, so that when each upper sheet metal portion is parallelly put on a corresponding lower sheet metal portion, each of the downwardly pressed out portions of the upper sheet metal portion is received in the groove portion of the lower sheet metal portion;

second stopper means which suppresses an axial displacement between the upper and lower sheet metal portions;

a case for encasing therein said honeycomb metallic catalyst bed; and inlet and outlet pipes which are connected to front and rear ends of said case.

2. A catalytic converter as claimed in claim 1, in which said second stopper means comprises portions pressed out upward from the groove portions, so that when each upper sheet metal portion is parallelly put on the corresponding lower sheet metal portion, each of the upwardly pressed out portions of the lower sheet metal portion is received in a recessed back part of the ridge portion of the upper sheet metal portion while engaging at one edge thereof with the downwardly pressed out portion of the upper sheet metal portion thereby to suppress an axial displacement between the two sheet metal portions.

3. A catalytic converter as claimed in claim 2, in which the downwardly pressed out portions are formed in every second ridge portions of each sheet metal portion, and in which the upwardly pressed out portions are formed in every second groove portions of each sheet metal portion.

4. A catalytic converter as claimed in claim 1, in which said second stopper means comprises:

an outlet end of said inlet pipe, said outlet end abutting against an axial front end of said honeycomb metallic catalyst bed; and an inlet end of said outlet pipe, said inlet end abutting against an axial rear end of said honeycomb metallic catalyst bed.

5. A catalytic converter as claimed in claim 4, in which the outlet and inlet ends of said inlet and outlet pipes are respectively formed with radially inwardly protruded flange portions which abut against the axial front and rear ends of said honeycomb metallic catalyst bed.

6. A catalytic converter as claimed in claim 1, in which said second stopper means comprises:

a flange portion radially inwardly protruded from a rear end of said case, said flange portion abutting against an axial rear end of said honeycomb metallic catalyst bed.

7. A catalytic converter as claimed in claim 1, in which said corrugated sheet metal portions are portions defined and possessed by a single elongate corrugated sheet metal which is rolled up.

8. A honeycomb metallic catalyst bed unit for a catalytic converter, comprising:

a plurality of corrugated sheet metal portions which are put on one another to constitute a honeycomb metallic catalyst bed, each sheet metal portion having a plurality of straight, parallel, alternate ridge and groove portions, so that when each upper sheet metal portion is parallelly put on a corresponding lower sheet metal portion having the groove portions of the upper sheet metal portion put on the ridge portions of the lower sheet metal portion, there are defined therebetween a plurality of through cells each having a regular square cross section; and a case for encasing therein said honeycomb metallic catalyst bed, wherein each of said through cells is defined by two jointed segments of the ridge portion of the upper sheet metal portion and two joined segments of the groove portion of the lower sheet metal portion, and wherein each of said sheet metal portions further has portions pressed out downward from the ridge portions, so that when each upper sheet metal portion is parallelly put on a corresponding lower sheet metal portion, each of the downwardly pressed out portions of the upper sheet metal portion is received in the groove portion of the lower sheet metal portion thereby to suppress a lateral displacement between the two sheet metal portions.

9. A honeycomb metallic catalyst bed unit as claimed in claim 8, in which each of said sheet metal portions further has portions pressed out upward from the groove portions, so that when each upper sheet metal portion is parallely put on the corresponding lower sheet metal portion, each of the upwardly pressed out portions of the lower sheet metal portion is received in a recessed back part of the ridge portion of the upper sheet metal portion while engaging at one edge thereof with the downwardly pressed out portion of the upper sheet metal portion thereby to suppress an axial displacement between the two sheet metal portions.

10. A honeycomb metallic catalyst bed unit as claimed in claim 9, in which the downwardly pressed out portions are formed in every second ridge portions of each sheet metal portion, and in which the upwardly pressed out portions are formed in every second groove portions of each sheet metal portion.

11. A honeycomb metallic catalyst bed unit as claimed in claim 8, in which said corrugated sheet metal portions are portions defined and possessed by a single elongate corrugated sheet metal which is rolled up.

\* \* \* \* \*